United States Patent [19]

Milliman

[11] Patent Number: 5,783,219
[45] Date of Patent: *Jul. 21, 1998

[54] DIE MEMBER FOR USE IN CROSS-HEAD DIE APPARATUS

[76] Inventor: James A. Milliman, 8644 Emerald Cir. South, Rome, N.Y. 13440

[*] Notice: The term of this patent shall not extend beyond the expiration date of Pat. No. 5,665,164.

[21] Appl. No.: 876,259

[22] Filed: Jun. 16, 1997

Related U.S. Application Data

[62] Division of Ser. No. 581,845, Jan. 2, 1996, Pat. No. 5,665,164.

[51] Int. Cl.⁶ .................... B29C 47/02; B29C 47/10
[52] U.S. Cl. .................. 425/113; 425/183; 425/190; 425/461; 425/467
[58] Field of Search .................... 425/113, 183, 425/190, 461, 467, 462; 118/420, 405, 419

[56] References Cited

U.S. PATENT DOCUMENTS

| | | | |
|---|---|---|---|
| 3,502,752 | 3/1970 | Brown | 425/113 |
| 4,339,298 | 7/1982 | Kanotz et al. | 425/133.1 |
| 4,838,777 | 6/1989 | Weber | 425/113 |
| 5,031,568 | 7/1991 | Milliman | 425/116 |
| 5,316,583 | 5/1994 | Milliman | 425/113 |
| 5,665,164 | 9/1997 | Milliman | 425/113 |

FOREIGN PATENT DOCUMENTS 56-40536  4/1981  Japan ................. 425/113

*Primary Examiner*—Khanh P. Nguyen
*Attorney, Agent, or Firm*—Charles S. McGuire; George R. McGuire

[57] ABSTRACT

A novel die member for positioning in a uniformly tapering, frustoconical portion of a through bore in a body member of co-extrusion, cross-head coating apparatus. The die member has an external surface with a first, frustoconical portion dimensioned for mating engagement with the body member bore extending from the front end of the die member and tapering outwardly to terminate in a plane parallel to and intermediate of the planes of the front and rear ends of the member. A second, cylindrical, external surface portion, of smaller diameter than the adjacent, larger end of the first surface portion, extends to the rear end of the die member. An annular groove of substantially semi-circular cross section extends into and 360° about the second surface portion rearwardly adjacent the first surface portion.

1 Claim, 6 Drawing Sheets

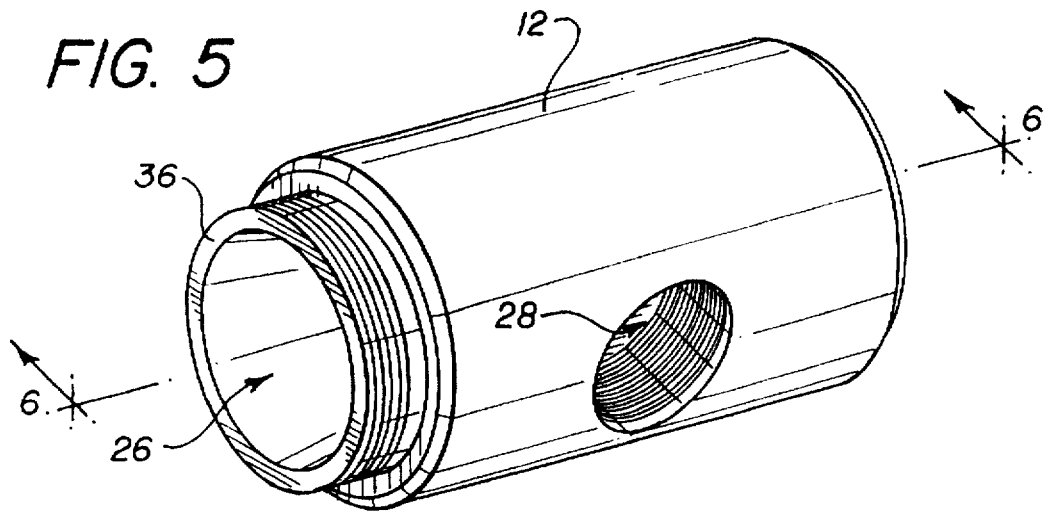
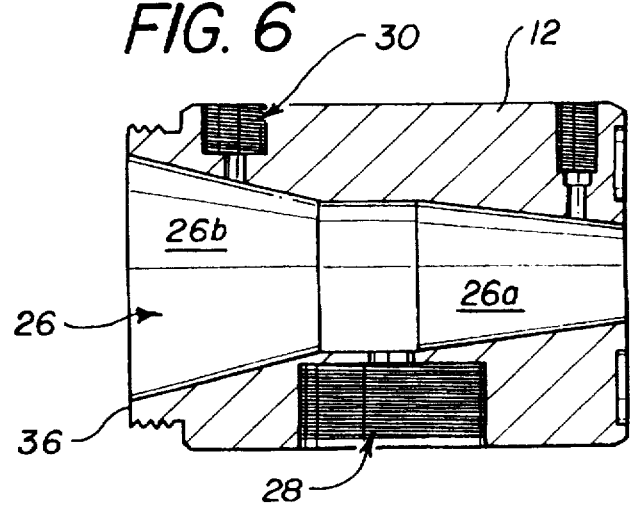
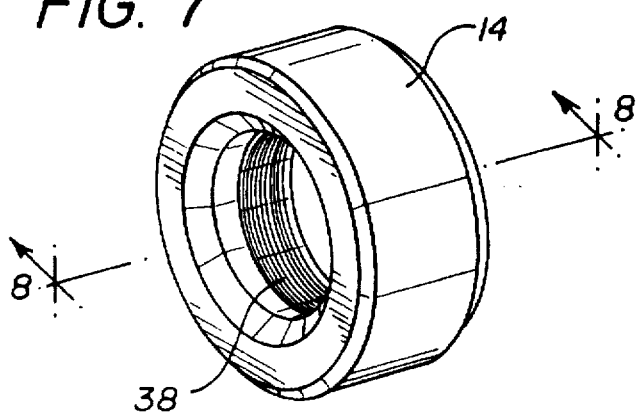
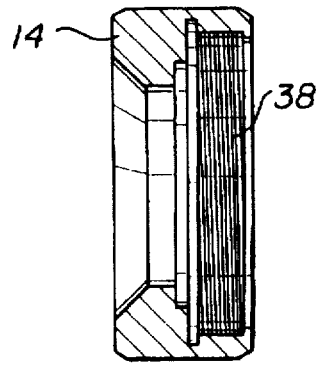

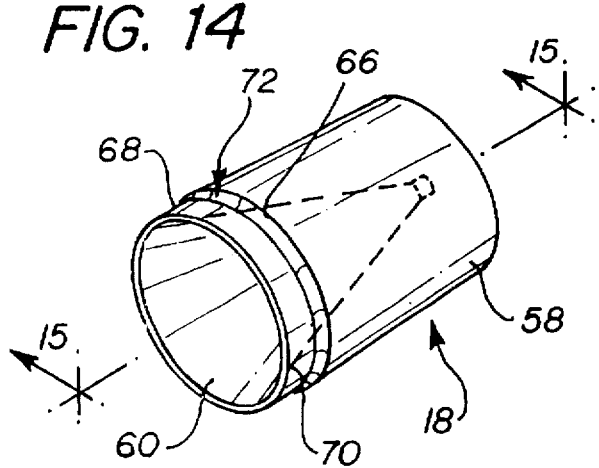
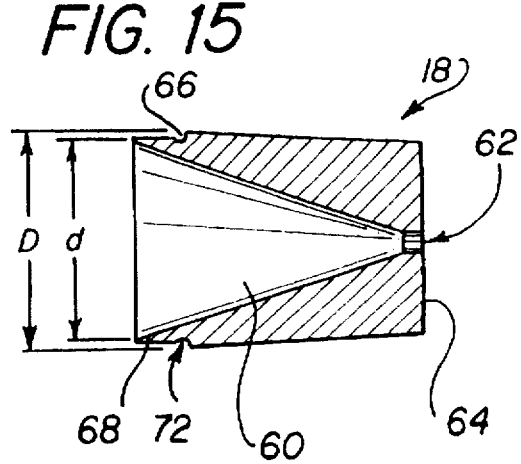
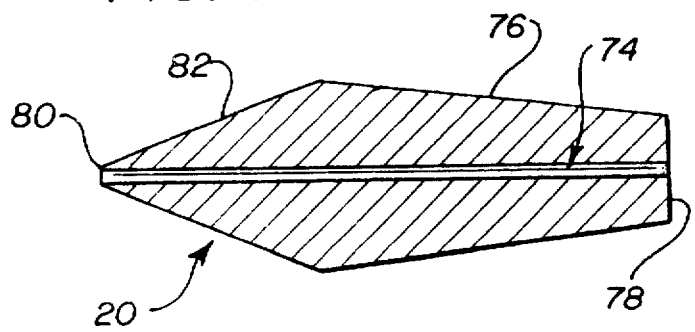
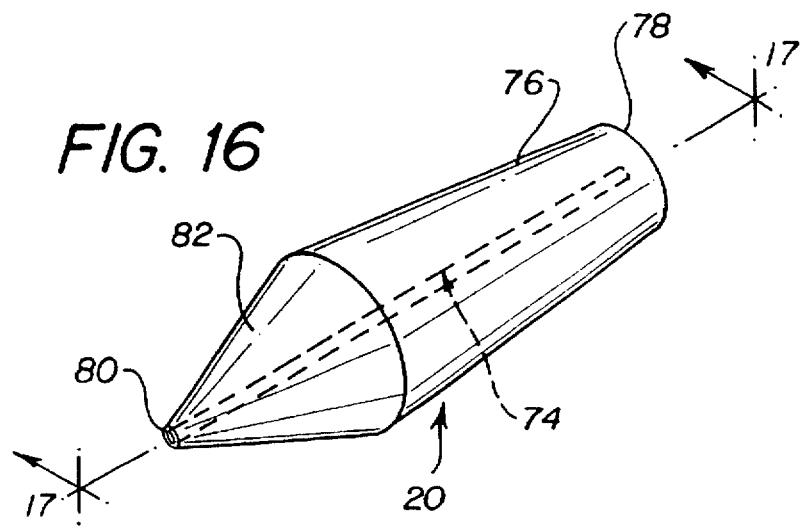

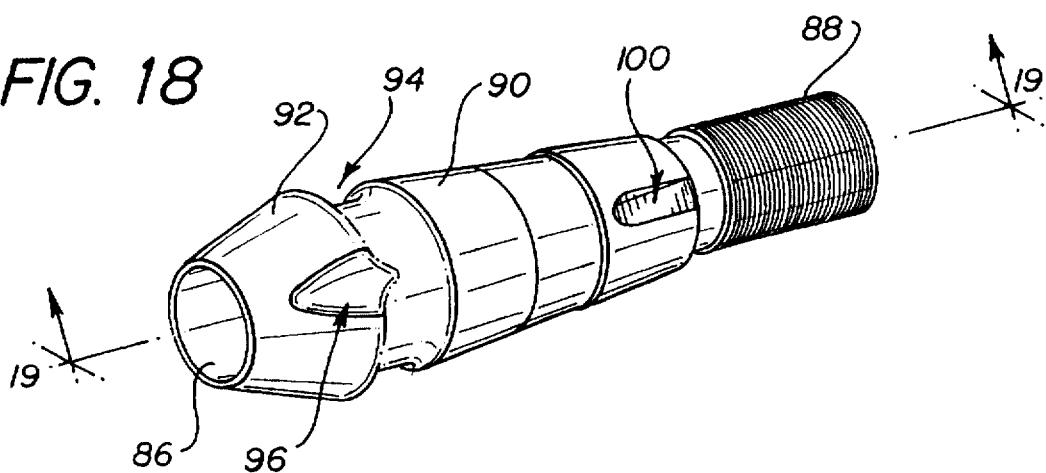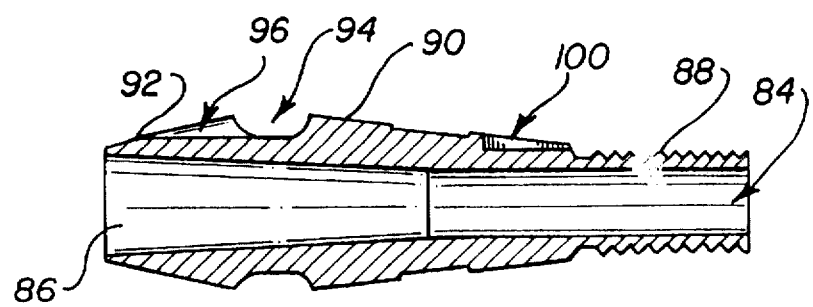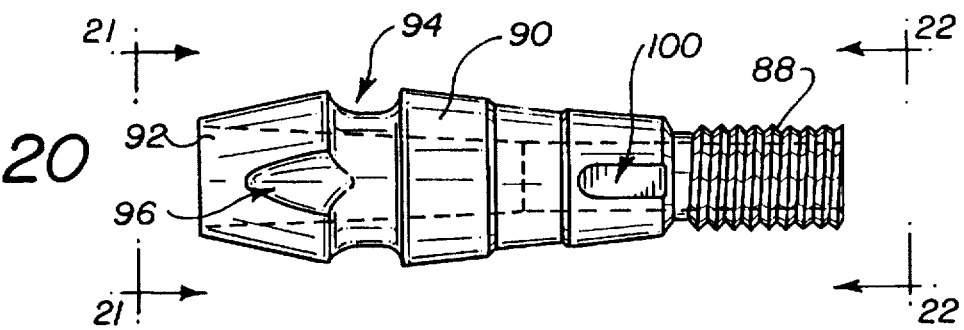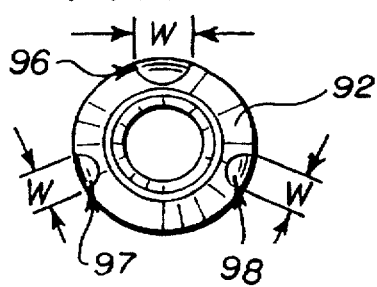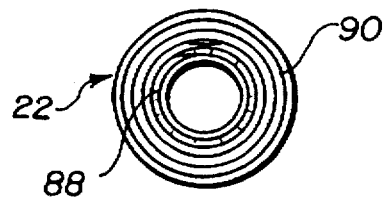

DIE MEMBER FOR USE IN CROSS-HEAD DIE APPARATUS

CROSS-REFERENCE TO RELATED APPLICATION

The present application is a division of application Ser. No. 08/581,845, filed Jan. 2, 1996 now U. S. Pat. No. 5,665,164.

BACKGROUND OF THE INVENTION

The present invention relates die members for use in to die assemblies of the cross-head type for applying coating materials to a filamentary member, e.g., plastic insulation to electrical wires. More specifically, the invention relates to novel and improved die members for use in co-extrusion, cross-head die apparatus for simultaneously applying two layers of coating materials, i.e., an inner and an outer layer, to a filamentary member as it is moved longitudinally through the apparatus.

Cross-head die assemblies, such as those disclosed in U.S. Pat. Nos. 5,031,568 and 5,316,583 of the present inventor, include a body portion having a through, axial bore communicating with a radial bore. A tip member, having a through bore for establishing the path of travel of the filamentary member, is supported in the body axial bore by a tip holder, also referred to as a core tube. External surfaces on the tip and holder cooperate with internal surfaces on the die elements to define a flow path for the coating material, which is heated in order to be in a flowable state. The flow path leads to a die orifice through which the filamentary member and coating material pass as the coating layer is applied.

It is sometimes necessary to apply two layers of coating material, one in covering relation to the other, to electrical wires, or the like. This may be accomplished by providing in the body portion two radial bores, through which sources of the two coating materials communicate at different locations within the axial bore. It is difficult, however, to ensure proper flow of the two materials through the die apparatus, providing the necessary symmetrical, coaxial coating layers.

It is a principal object of the present invention to provide a novel die member for use in cross-head die apparatus for applying inner and outer layers of coating materials to a filamentary member in a unique manner, resulting in superior, double-layered coatings.

Another object is to provide a novel die member for use in co-extrusion, cross-head die apparatus which simplifies and facilitates the application of two, superposed layers of coating materials to a filamentary member.

Other objects will in part be obvious and will in part appear hereinafter.

SUMMARY OF THE INVENTION

The die apparatus wherein the die member of the invention is employed comprises an assembly of elements including the usual body member with through, axial bore, a tip, tip holder (core tube), the die member of the present invention and die holder. Two radial bores in the body member communicate with the axial bore therein. The rear portion of the tip holder external surface is in mating engagement with a portion of the interior surface of the body axial bore, and an annular groove, extending 360° around the tip holder is positioned inwardly adjacent one of the radial bores in the body. The annular groove communicates through three axial grooves with a flow passage extending over the forward surface portion of the tip holder and the tip.

The die member of the present invention having the orifice through which the coating materials are extruded is matingly engaged on its external surface with a die holder which in turn is matingly engaged with the forward surface portion of the axial bore. A first annular groove extends 180° about the external surface of the die holder and is positioned with its midpoint inwardly adjacent the second radial bore in the body member to receive the second coating material. The first annular groove communicates at its ends with a second annular groove, positioned rearwardly of the first groove and extending 360° about the die holder.

A succession of evenly spaced, small openings extend through the die holder about the second annular groove. The second coating material flows from the second radial bore into the first annular groove of the die holder and thence into the second annular groove at diametrically opposite positions. The second coating material flows entirely around the second annular groove and through the openings therein into a flow passage defined between an internal surface portion of the die holder and the external surface of a portion of the die member extending rearwardly from the portion in mating engagement with the die holder.

The second coating material flows rearwardly of the apparatus for a short distance before flowing forwardly through a flow passage common to the first coating material defined between external surface portions of the tip holder and tip and the internal surface of the die member. The second coating material flows through this passage in superposed relation with the first coating material. It is in this relation that the two materials pass through the die orifice, coaxially surrounding the filamentary member.

The foregoing and other features and advantages of the invention will be more readily understood and fully appreciated from the following detailed description taken in conjunction with the accompanying drawings, which are now referred to.

BRIEF DESCRIPTION OF THE DRAWINGS

FIG. 5 is a perspective view of the body member of the apparatus;

FIG. 6 is a side elevational view in section on the line 6—6 of FIG. 5;

FIG. 7 is a perspective view of a retaining collar of the apparatus;

FIG. 8 is a side elevational view in section on the line 8—8 of FIG. 7;

FIG. 14 is a perspective view of the die member of the present invention;

FIG. 15 is a side elevational view on the line 15—15 of FIG. 14;

FIG. 16 is a perspective view of the tip element;

FIG. 17 is a side elevational view on the line 17—17 of FIG. 16;

FIG. 18 is a perspective view of the tip holder/core tube element of the apparatus;

FIG. 19 is a side elevational view in section on the line 19—19 of FIG. 18;

FIG. 20 is a full side elevational view of the tip holder, rotated 90° from the position of FIG. 19; and FIGS. 21 and 22 are front and rear elevational views, respectively, seen from the positions indicated by lines 21—21 and 22—22 of FIG. 20.

DETAILED DESCRIPTION

Figure 1:
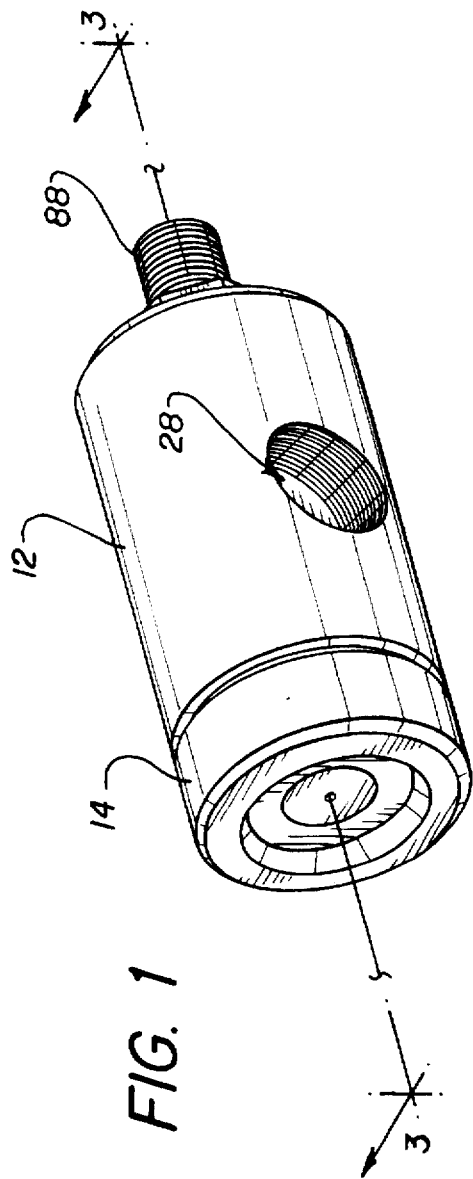
FIG. 1 is a perspective view of fully assembled cross-head die apparatus incorporating the die member of the present invention.
Figure 3:
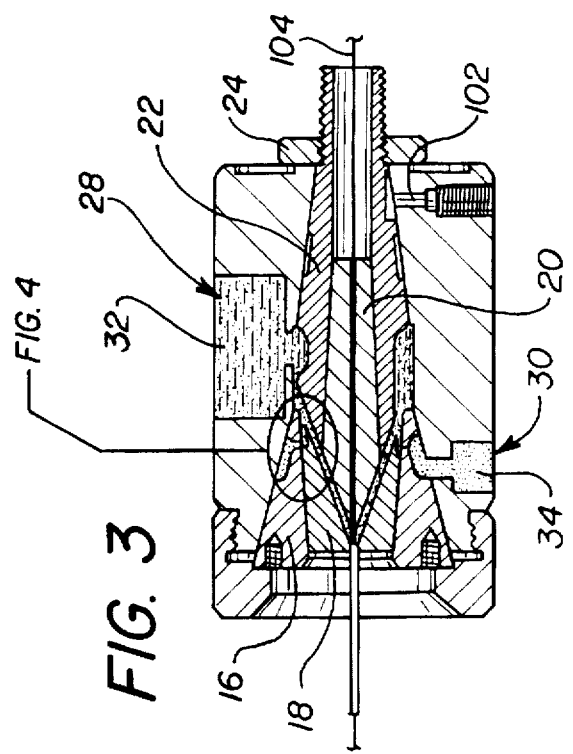
FIG. 3 is a side elevational view in full section on the line 3—3 of FIG. 1.
Figure 4:
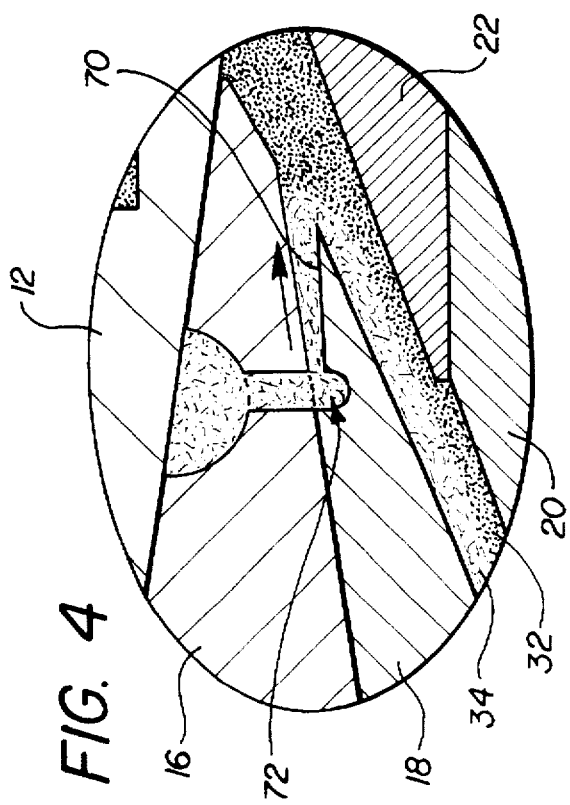
FIG. 4 is an enlarged fragment of the circled portion of FIG. 3.
Figure 2:
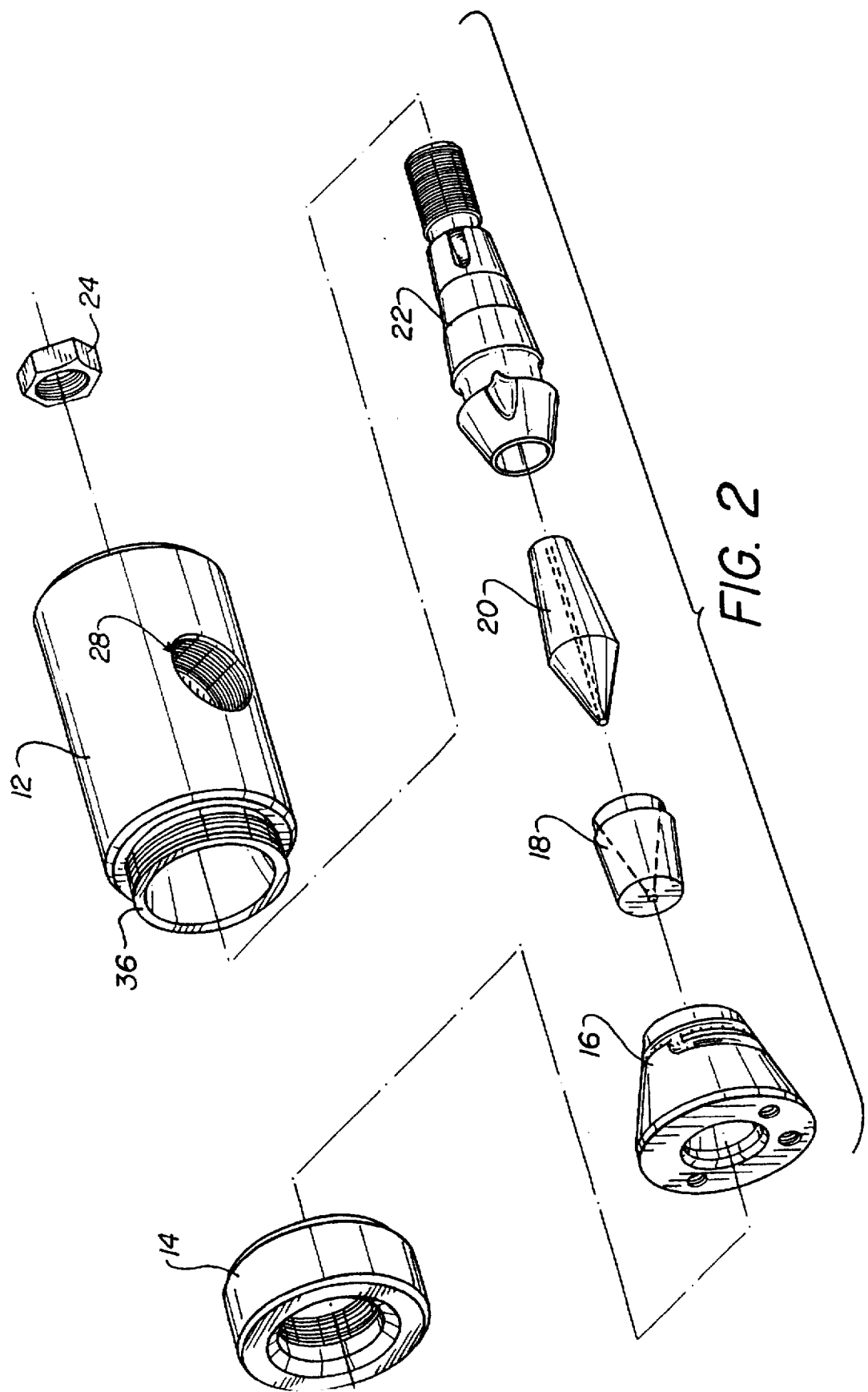
FIG. 2 is an exploded perspective view showing separately the elements forming the apparatus of FIG. 1.
Figure 9:
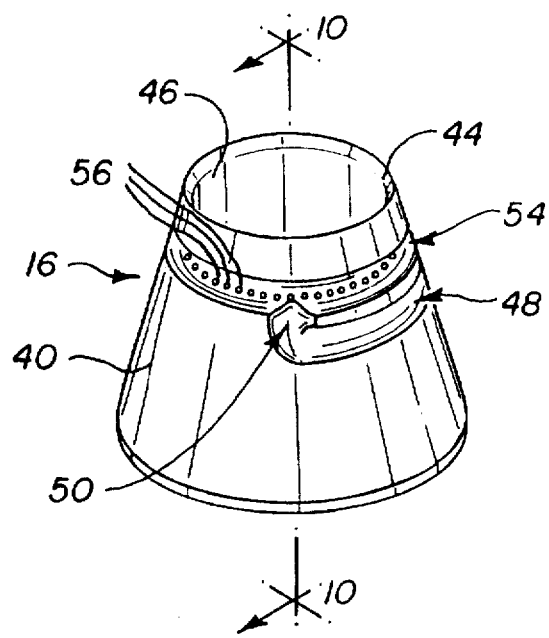
FIG. 9 is a perspective view of the die holder element.
Figure 10:
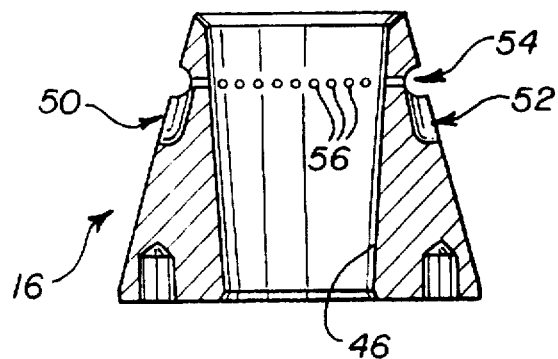
FIG. 10 is a side elevational view on the line 10—10 of FIG. 9.
Figure 11:
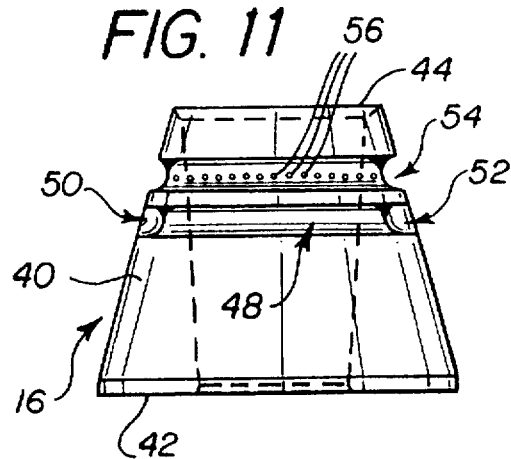
FIGS. 11, 12 and 13 are side, front and rear views, respectively, of the die holder.
Figure 12:
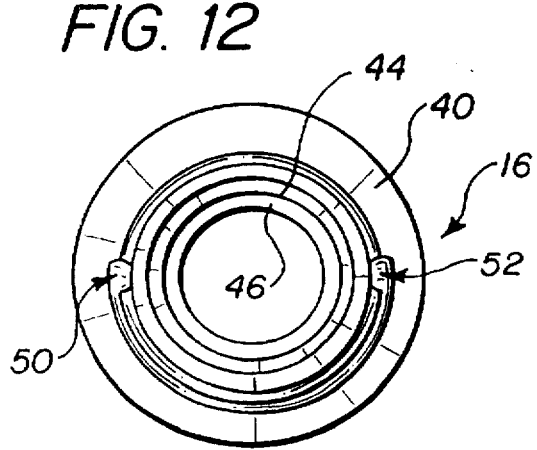
Figure 13:
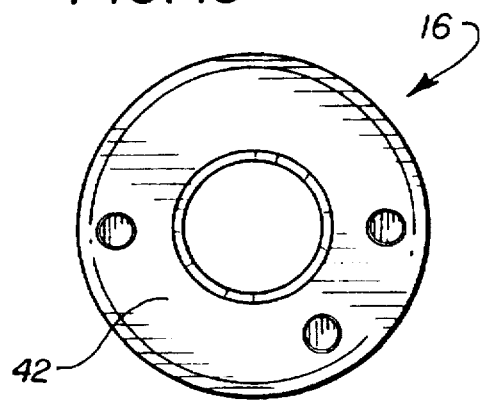

The completely assembled cross-head die apparatus of the invention, as shown in FIGS. 1 and 3, is generally denoted by reference numeral 10. Individual components of apparatus 10, as seen more fully in FIG. 2, are cylindrical body member 12, front retaining collar 14, die holder 16, die member 18, tip 20, tip holder/core tube 22 and rear retaining nut 24. Body member 12, shown individually in FIGS. 5 and 6 includes through, axial bore 26 with which first radial bore 28 and second radial bore 30 communicate. Radial bores 28 and 30 are internally threaded for connection thereto in conventional fashion of respective sources of first and second coating materials 32 and 34, respectively (FIGS. 3 and 4). The coating materials are typically plastics suitable for the intended application, heated to a flowable condition. Front portion 36 of body member 12 is externally threaded for engagement with internal threads 38 of collar 14 (FIGS. 7 and 8).

Proceeding from front to rear, the next element of the assembly is missing text shown individually in FIGS. 9–13. Die holder 16 has a frustoconical external surface 40 extending between front and rear ends 42 and 44, respectively, and a through, axial bore defined by frustoconical, internal surface 46. First annular groove 48 extends 180° about external surface 40 and communicates at its ends through channels 50 and 52 with second annular groove 54 which extends the full 360° about surface 40. A succession of evenly spaced openings 56 extend through the die member between groove 54 and internal surface 46. As an indication of relative dimensions, for a die holder having a bore with diameters of 0.962" and 1.14" at its front and rear ends, respectively, groove 54 may be 0.18" in both width and depth with a total of thirty four openings 56, each having a diameter of 0.05".

Die member 18 has frustoconical external and internal surfaces 58 and 60, respectively, the latter terminating at orifice 62 in front wall 64 of the die member. External surface 58 extends from front wall 64 to a rearward end 66. Portion 68 of the die member extends rearwardly from end 66 of surface 58. External surface 70 of portion 68 is substantially cylindrical, having a diameter d slightly less than the diameter D at end 66 of surface 58. Annular groove 72 extends entirely about the die member at the forward end of portion 68.

Tip 20, as seen in FIGS. 16 and 17, has a through, axial bore 74 with a diameter slightly larger than that of the filamentary member to be coated by apparatus 10. The external surface of tip 20 is divided into two frustoconical portions, rear portion 76 diverging outwardly from rear end 78 toward front end 80, and forward portion 82 converging inwardly from rear to front, terminating at the front end of bore 74.

The tip holder or core tube 22 is shown individually in FIGS. 18–22. A through, axial bore is defined by cylindrical, rear portion 84 and frustoconical, forward portion 86. The external surface of tube 22 includes cylindrical, externally threaded, rear portion 88, intermediate portion 90 diverging outwardly from rear to front, and forward portion 92 converging inwardly from rear to front. Intermediate and forward surface portions 90 and 92 are separated by annular groove 94 which extends fully about tube 22. Three axial grooves 96, 97 and 98 extend forwardly from annular groove 94 into forward surface portion 92. As indicated in FIG. 21, axial groove 96 has a maximum width W which is greater than the equal widths w of axial grooves 97 and 98. The midpoints of axial grooves 97 and 98 are each spaced from the midpoint of axial groove 96 by 100°, thus being spaced 160° from one another. Keyway 100 is formed in intermediate surface portion 90.

The manner of assembly of the elements and their physical relationships in the fully assembled condition are best understood with reference to FIGS. 2–4. Core tube 22 is inserted in axial bore 26 of body member 12 from front to rear with intermediate portion 90 of the external surface of the tube in mating engagement with rear portion 26a (FIG. 6) of the internal surface of bore 26. Rotational orientation of tube 22 relative to body member 12 is established by key 102 (FIG. 3) extending into keyway 100. Tube 22 is secured in position by tightening nut 24 upon portion 88 against the rear surface of body member 12. Annular groove 94 is inwardly adjacent the inner end of first radial bore 28. The wider of the axial grooves in core tube 22, i.e., groove 96, is positioned 180° from the inner end of bore 28.

Tip 20 is inserted into the forward end of axial bore 86 of core tube 22, either before or after insertion of the core tube in axial bore 26. Frustoconical surface 76 is angled for mating engagement with the forward portion of bore 86. Since tip 20 is symmetrical about its central axis, rotational orientation is of no consequence.

The forward end of die member 18 is inserted into the rearward end of the bore in die holder 16, placing surfaces 46 and 58 in mating engagement. Die holder 16 is then inserted into the forward end of axial bore 26, placing external surface 40 of the die holder in mating engagement with internal surface portion 26b of the axial bore in body member 12. Collar 14 is threaded onto portion 36 and tightened against the forward surface of body member 12 to secure die holder 16 in its assembled position wherein the midpoint of annular groove 48 is inwardly adjacent the inner end of second radial bore 30, completing assembly of the elements.

Filamentary member 104, assumed for purposes of present discussion to be an electrical wire, is moved from a supply roll (not shown) positioned rearwardly of apparatus 10, through cylindrical portion 84 of the bore in core tube 22, bore 74 of tip 20 and orifice 62 of die member 18, and secured to a winding station (not shown) a suitable distance forwardly of the apparatus. As wire 104 is moved axially at a suitable speed through apparatus 10, a uniform, inner layer of first coating material 32 is deposited on the wire and an outer layer of second coating material 34 is deposited in covering relation to the inner layer.

The nature of the coating operation is best understood with reference to FIG. 3 and the enlarged fragment thereof in FIG. 4. First coating material 32 flows through radial bore 28 into annular groove 94 causing it to flow around and fill groove 94, then flow forwardly of the apparatus, through axial grooves 96, 97 and 98, as well as through a small (e.g., 0.015") clearance between bore 26 and the periphery of core tube 22 between the three axial grooves. Positioning wider groove 96 180° opposite the inlet of material 32, with the two narrower grooves 97, 98 on opposite sides with their midpoints each 80° from the midpoint of the inlet, as well as providing the aforementioned clearance, ensures an even distribution of material 32 about the established flow path.

Second coating material 34 flows from radial bore 30 into first annular groove 48 of die holder 16. Since external surface 40 of the die holder is in mating engagement with opposing portions of surface 26b of bore 26 both forwardly and rearwardly of groove 48, material 34 flows 90° in each direction about groove 48 and through channels 50 and 52 into second annular groove 54. Material 34 flows 360° about groove 54 and thence radially inwardly through openings 56, into the annular space between surface 70, including groove 72, of rear portion 68 of die member 18 and the opposing portion of surface 26b of bore 26. As is evident from close inspection of FIG. 4, material 34 flows a short distance through this annular space in a direction rearwardly of apparatus 10, as indicated by arrow 106, before reversing direction and flowing forwardly, in covering relation to the layer of first coating material 32. For clarity, two different types of stippling are used to illustrate first and second coating materials 32 and 34.

The path through which first coating material 32 is constrained to flow from its entry into bore 26, about annular groove 94, through axial grooves 96, 97 and 98 and the clearance between core tube 22 and bore 26 is termed a first flow path. Likewise, the path of second coating material 34 from radial bore 30 into annular groove 48, thence through channels 50 and 52 into annular groove 54, through openings 56 and rearwardly through the annular space between external surface 70 of rear portion 68 of die member 18 and the opposing surface of die holder 16 is termed a second flow path. The first and second flow paths merge at the rearward end of die member 18 and both the first and second coating materials flow through the third flow passageway, i.e., the frustoconical space between external surface portions of core tube 22 and tip 20, and internal surface 60 of die member 18 to orifice 62 therein.

Throughout the third flow path, second material 34 remains in covering relation to first material 32, and it is in this relation that the materials are applied as coatings to wire 104. After exiting apparatus 10, materials 32 and 34 begin to cool and harden, and the coated wire may be wound on a conventional spool a suitable distance forwardly of apparatus 10.

What is claimed is:

1. A one-piece die member of predetermined axial length between front and rear ends for positioning in a uniformly tapering, frustoconical portion of an axial bore in the body of a cross-head type, coextrusion coating apparatus, said frustoconical portion having an axial length greater than said predetermined length, said die member having:

a) front and rear ends in parallel, first and second planes, respectively, spaced by said predetermined distance;

b) a first, external surface portion extending rearwardly from said first plane to an third plane, parallel with said first and second planes and tapering outwardly from said first plane in the same configuration as said frustoconical portion of said axial bore to a diameter D at said third plane, whereby said die member may be placed in said axial bore with said first surface portion in mating engagement with said frustoconical portion of said axial bore;

c) a second, external surface portion extending axially from said third plane to said second plane, said second surface portion having a cylindrical configuration with a diameter d, between about 85% and 95% of D, whereby said second surface portion is spaced from the opposing surface of said frustoconical portion of said axial bore by a distance which increases from said third to said second plane;

d) a groove of uniform width and substantially semi-circular cross section extending into and 360° about said second surface portion rearwardly adjacent said third plane, said uniform width being less than one-half the axial distance between said third and second planes; and e) a conical, internal surface extending forwardly and inwardly from said third plane to communicate with an orifice in said front end of said die member.

* * * * *